United States Patent [19]
Sommer, Jr. et al.

[11] Patent Number: 5,638,959
[45] Date of Patent: Jun. 17, 1997

[54] ROTARY MATERIALS SEPARATOR

[75] Inventors: Edward J. Sommer, Jr.; James A. Kearley; Charles E. Roos, all of Nashville; Galen L. Romine, Hermitage; Jimmy C. Curtis, Gallatin, all of Tenn.

[73] Assignee: National Recovery Technologies, Inc., Nashville, Tenn.

[21] Appl. No.: 353,330

[22] Filed: Dec. 5, 1994

Related U.S. Application Data

[63] Continuation-in-part of Ser. No. 790,216, Nov. 8, 1991, Pat. No. 5,370,234.

[51] Int. Cl.⁶ ................................................ B07C 5/00
[52] U.S. Cl. .................... 209/44.1; 209/221; 209/930; 209/636
[58] Field of Search ...................... 209/44.1, 44.3, 209/636, 637, 689, 690, 221, 241, 257, 293, 294, 296–299, 904, 930, 615, 616, 699, 687, 229, 228; 241/24, 75; 414/412

[56] References Cited

U.S. PATENT DOCUMENTS

| | | | |
|---|---|---|---|
| 938,139 | 10/1909 | Gotshall | 209/299 |
| 2,768,628 | 10/1956 | Hermanson | 209/299 |
| 4,046,679 | 9/1977 | Schloemann | 209/221 |
| 4,230,560 | 10/1980 | Nakajima | 209/221 |
| 4,317,717 | 3/1982 | Nakajima | 209/221 |
| 4,318,804 | 3/1982 | Nakajima | 209/221 |
| 4,533,053 | 8/1985 | Kenny et al. | 209/636 |
| 4,533,054 | 8/1985 | Sommer, Jr. et al. | 209/930 |
| 4,557,387 | 12/1985 | Frenkel | 209/636 |
| 4,620,627 | 11/1986 | Griffiths | 198/580 |
| 5,370,234 | 12/1994 | Sommer, Jr. et al. | 209/44.1 |

FOREIGN PATENT DOCUMENTS

| | | | |
|---|---|---|---|
| 0 202 424 | 11/1986 | European Pat. Off. | 209/930 |
| 0 339 490 | 11/1989 | European Pat. Off. | 209/44.3 |
| 1 468 610 | 3/1989 | U.S.S.R. | 209/930 |
| 1 558 509 | 4/1990 | U.S.S.R. | 209/930 |
| 2 206 297 | 1/1989 | United Kingdom | 209/930 |

*Primary Examiner*—D. Glenn Dayoan
*Attorney, Agent, or Firm*—Foley & Lardner

[57] ABSTRACT

Solid waste is sorted by passing it through a rotating hollow drum which has sets of extensions, called flights, from the interior wall of the drum, some sets of flights being separated from each other and from the entrance to the drum by blank sections along the drum wall. The first set of flights are knives, so that filled plastic waste bags are opened and emptied. The second set of flights are adjustable magnet strips, lifting and depositing ferrous material onto a conveyor. A ferrous scraper removes ferrous materials, for depositing onto the conveyor. The third set of flights are flexible lifters for lifting and depositing glass, grit and dirt onto another conveyor. A bar screen is positioned over the conveyor to screen out larger materials, clean the lifters, and to be cleaned by the lifters. The invention further includes a method of sorting solid waste comprising providing a rotary materials separator according to the invention, placing a stream of materials into the drum, and passing the stream through the drum.

19 Claims, 17 Drawing Sheets

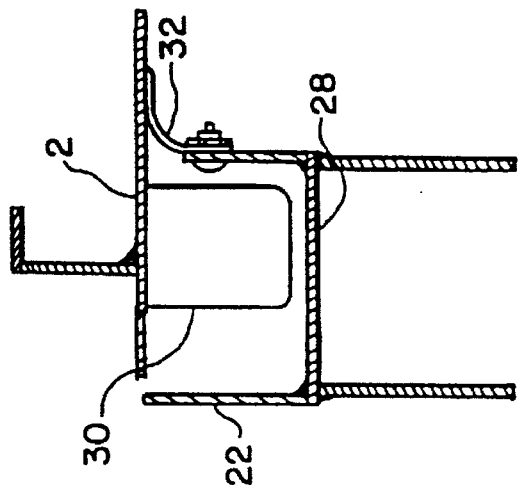
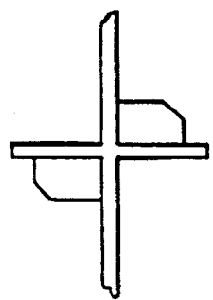
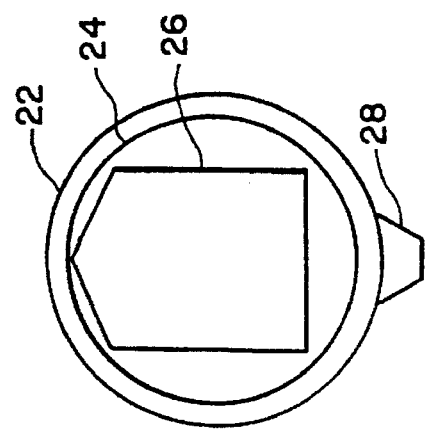
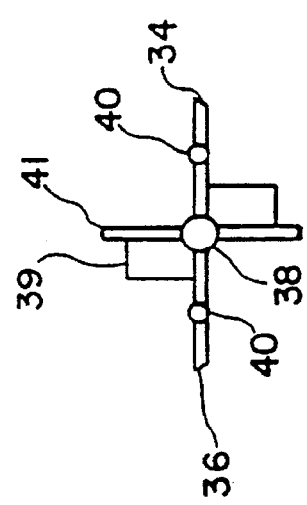

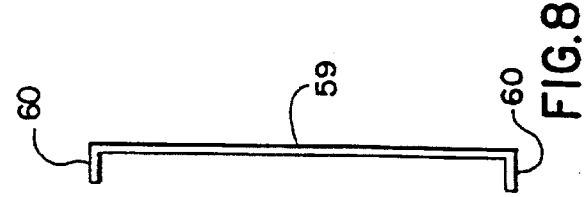
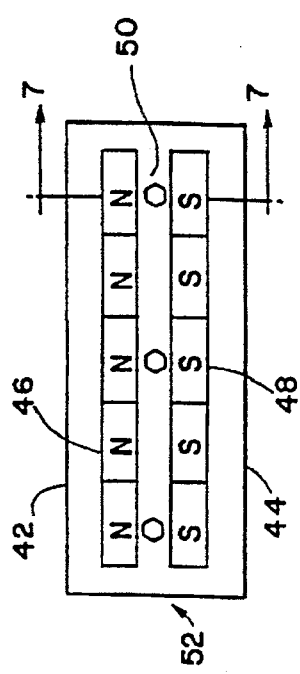
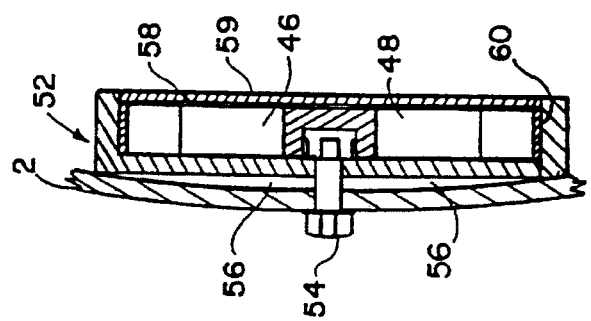

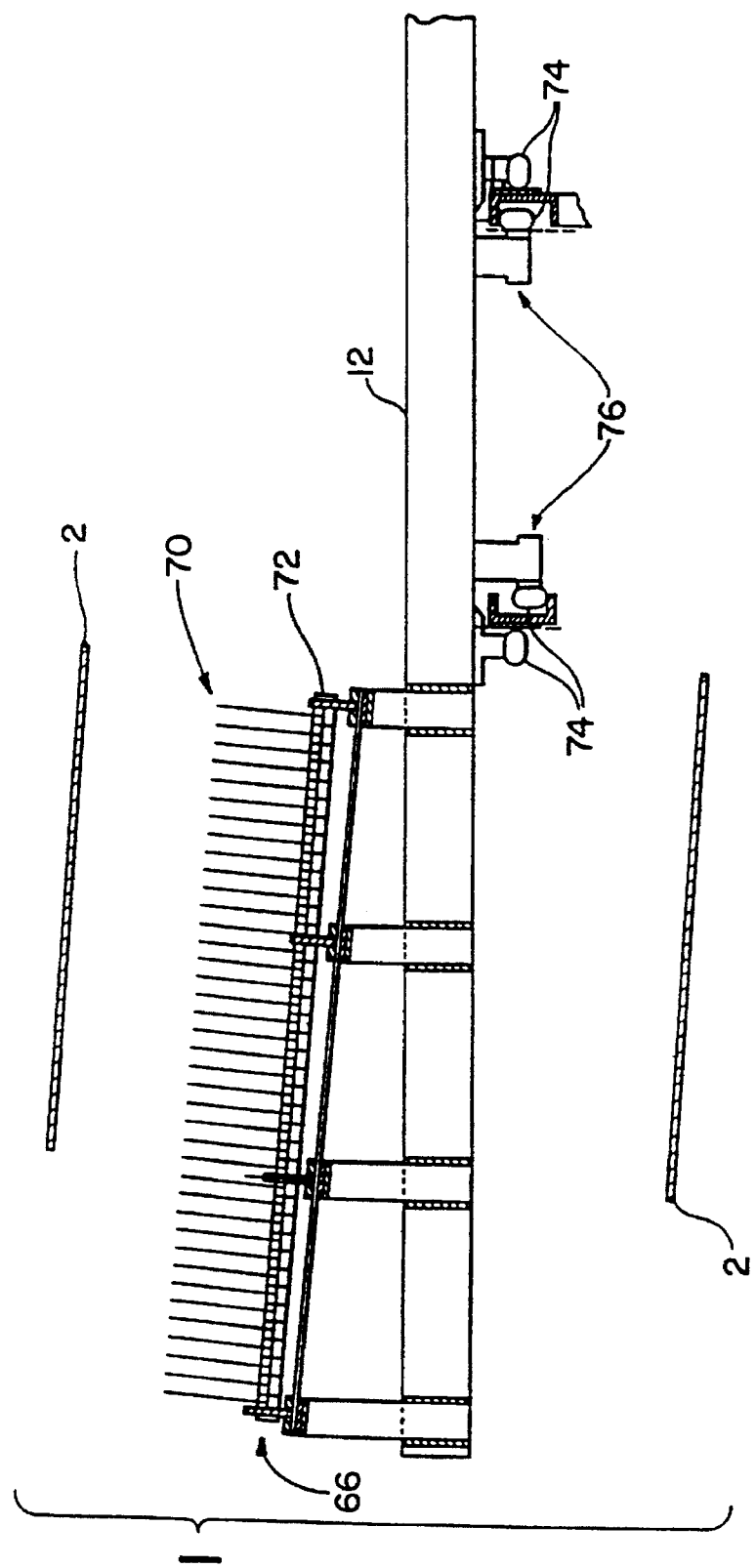

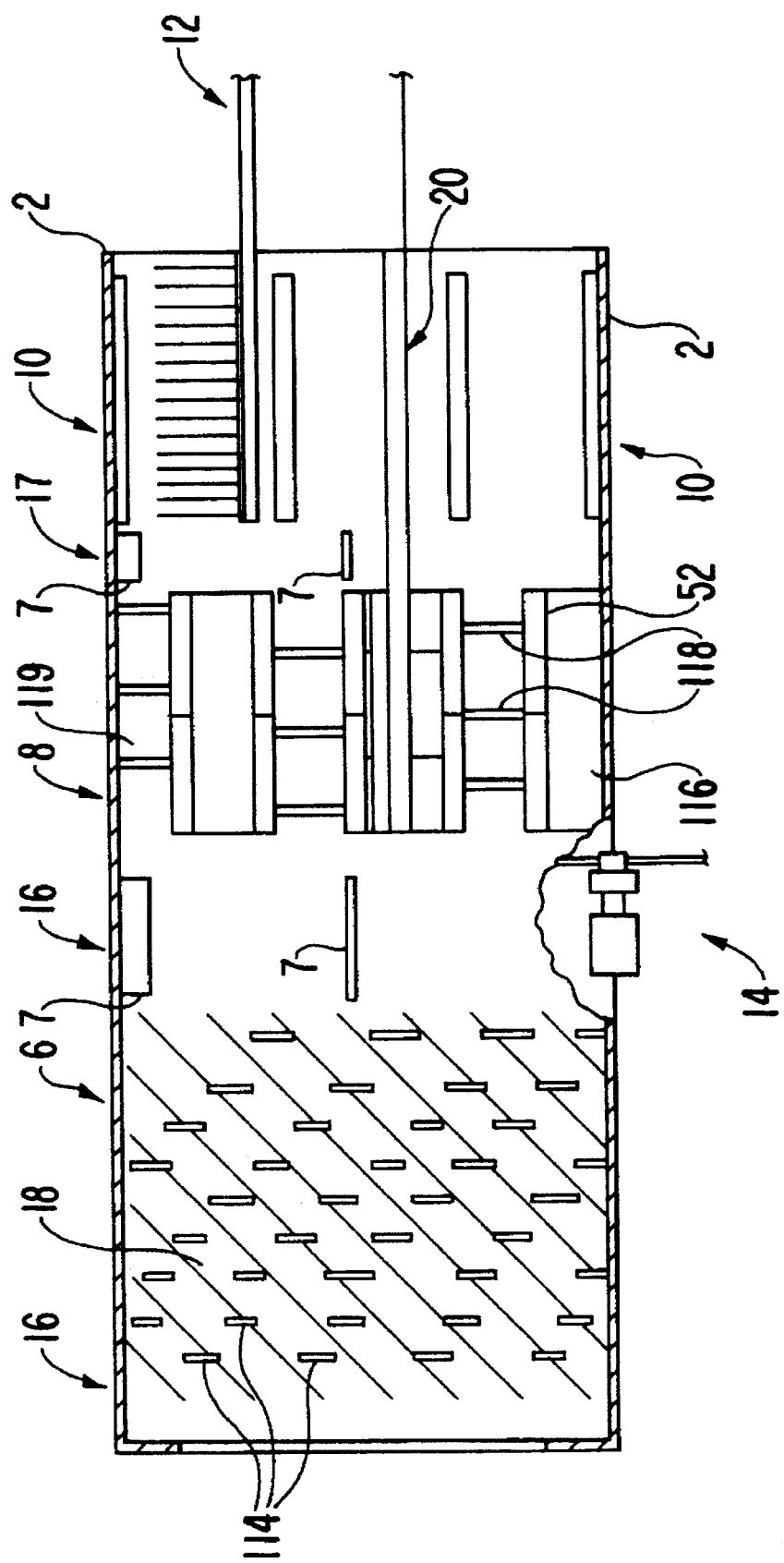

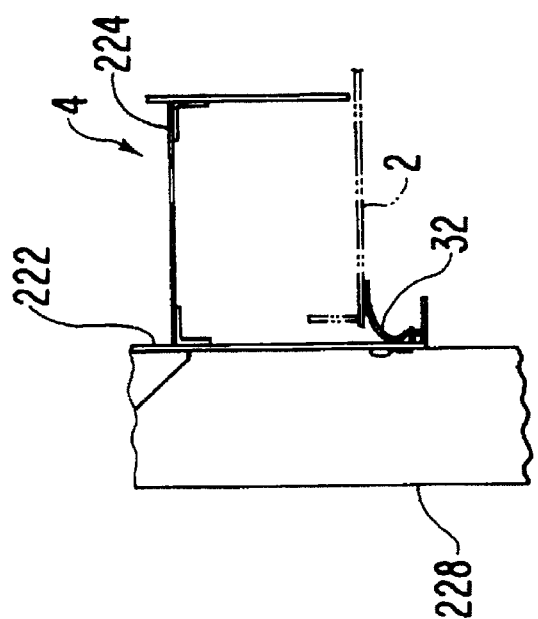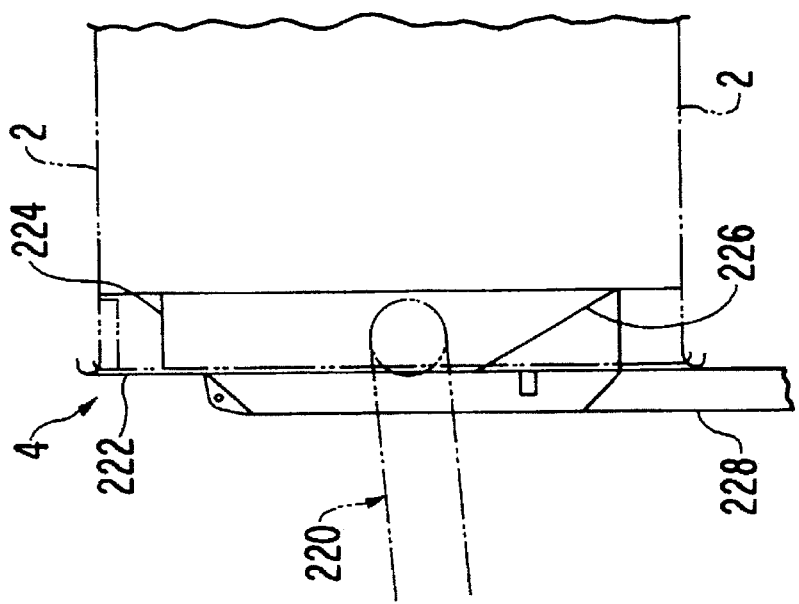

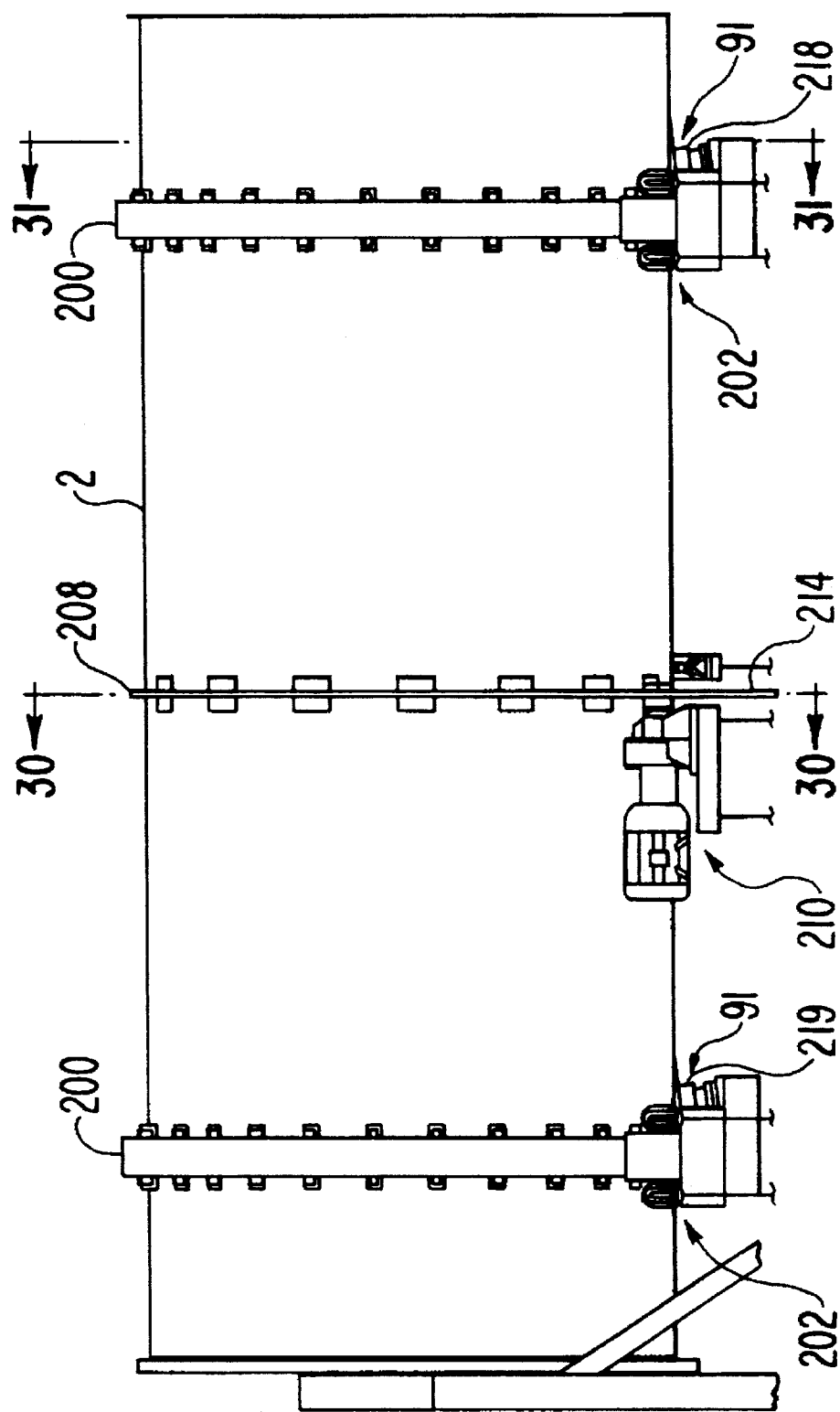

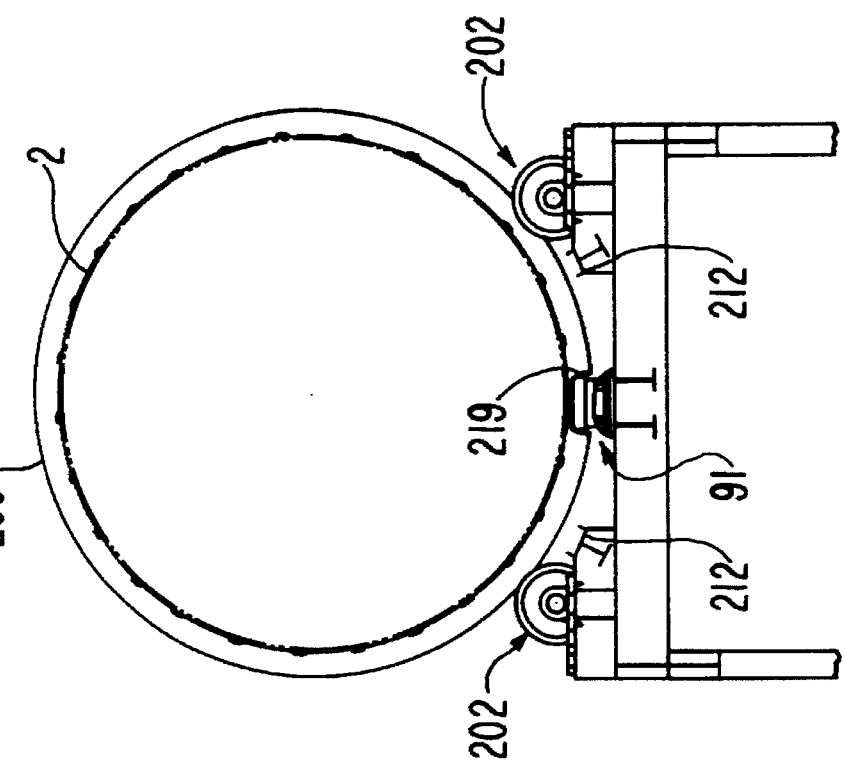
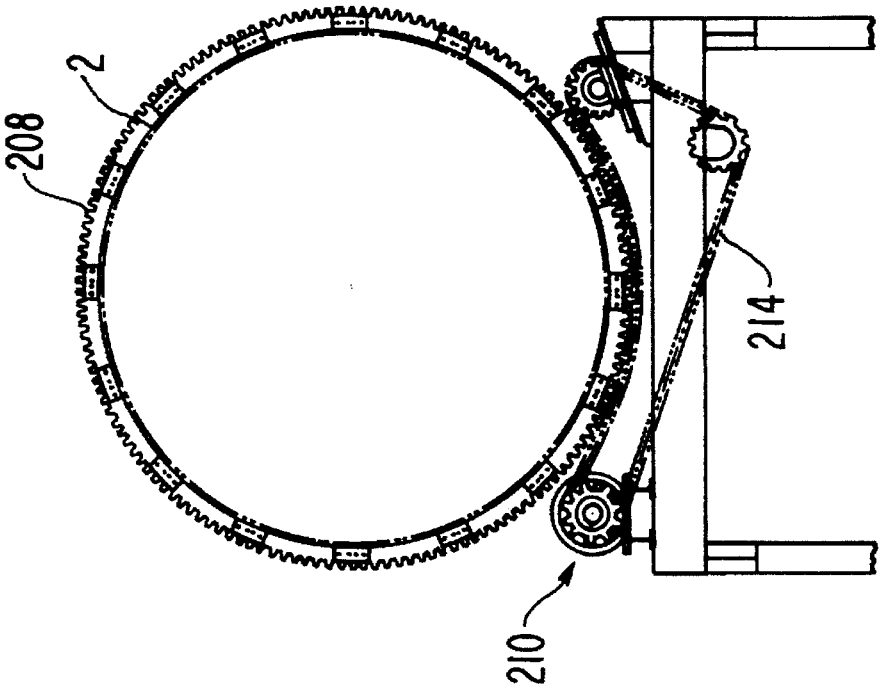

ROTARY MATERIALS SEPARATOR

CROSS REFERENCE TO RELATED APPLICATION

This application is a continuation-in-part of U.S. application Ser. No. 07/790,216 filed Nov. 8, 1991, by Edward J. Sommer, Jr., et al. now U.S. Pat. No. 5,370,234.

BACKGROUND OF THE INVENTION

1. Field of the Invention

The present invention is a rotary materials separator with sets of extensions inside a rotating drum and conveyors such that a stream of solid waste may be introduced into the drum, garbage bags in the stream are opened, and metal materials, glass, grit, and dirt are separated from the stream.

2. Brief Description of the Related Art

One system for separating solid waste is disclosed in U.S. Pat. No. 4,533,054, issued Aug. 6, 1985, to Edward Sommer, Jr., et al. In the '054 patent, solid waste is preclassified by passing it through a rotating drum which first homogenizes the waste by lifting, dropping, churning, ripping, and fluffing. Next, smaller sized heavier particles are lifted to the upper part of the drum, from which they are removed. The remaining waste is discharged at the end of the drum.

Another system is disclosed in U.S. Pat. No. 4,533,053, issued Aug. 6, 1985, to Garry R. Kenny, et al. The '053 patent is a continuation-in-part of the '054 patent. The '053 patent further provides for magnetic flights along a section of the drum to lift particles and materials subject to magnetic attraction, and a removal channel for those particles.

Unfortunately, prior designs are inefficient in opening plastic garbage bags in a stream of solid waste, and thus the waste stream exiting from the drum contains many unopened bags. Also, the sharp rods in the first section are neither removable nor reversible, thus making maintenance or sharpening difficult.

Materials being fed into the drum tended to be interfered with by the rod extensions adjacent to the opening. Further interference by materials in adjacent sections of the drum caused materials to be separated in one section to pass into another section without being properly sorted.

Furthermore, according to prior designs, the flights for lifting higher density material from the stream are made of rigid material. In operation, sticky materials in the stream quickly clog the surfaces and fill in the flights of lifters, rendering them ineffective.

The '053 and '054 patents have the additional disadvantage that bulky items, such as wood pallets, can be carried up and wedged between the exit conveyor or exit slide and wall of the drum during drum rotation.

The '053 and '054 patents did not provide for a method of adjusting the heights of the magnets, and therefore the scraper assembly did not scrape the magnets evenly with a consequent loss of efficiency.

The pressure applied by the drum drive mechanism during operation was not adjustable, although in practice less pressure is necessary once the rotation is up to speed. This resulted in excessive wear on the drive wheel.

The rubber tires and constructed steel bands have poor wear properties and rough rotational action. Other poor wear properties are evident in scrapers and the scraped portions of the drum.

Thus there is a need for an improved method and apparatus for separating materials which is self-cleaning and does not become obstructed by the waste material. Also, an efficient, easily and safely maintained bag opening section is required. A further need is for a method of relieving drive wheel pressure during rotation. Another need is for a way to prevent materials in one section from dropping into other sections or interfering with other sections. Also, there is a need for the magnets to have an adjustable height. Another need is for an apparatus with better wear properties.

SUMMARY OF THE INVENTION

It is an object of the present invention, therefore, to provide an improved method and apparatus for separating and sorting materials in a solid waste stream.

It is another object of the invention to provide a sorter which more efficiently opens garbage bags in a waste stream.

It is another object of the invention to provide an improved sorter for metallic materials.

It is an additional object of the invention to provide for more positive passage of materials through the sorter.

It is an additional object of the invention to provide a sorter with better wear properties, greater structural integrity, and smoother rotational action.

It is an additional object of the invention to allow safer or easier installation and maintenance.

It is another object of the invention to provide an improved self-cleaning, non-jamming rotary materials separator.

It is another object of the invention to provide an improved rotary materials separator.

According to a first aspect of the invention there is provided a rotary materials separator. The separator includes a hollow drum open at both ends, to be rotated around a cylindrical axis. On the inside of the wall of the drum is a first section, a second section, and a third section. A plurality of knives extends from the first section. A plurality of adjustable magnet strips is on the second section, and a scraping device cantilevered into the second section. A plurality of extensions extends from the third section, and a movable conveyor cantilevered into the third section. A seal chamber is positioned over the mouth of the drum. A drive mechanism is positioned to rotate the drum.

BRIEF DESCRIPTION OF THE DRAWINGS

The present invention will be described below with reference to the accompanying drawings, wherein:

FIG. 2 is an end view of a seal chamber;

FIG. 3 is a cross-section of a lower portion of a seal chamber on a drum;

FIG. 4 is a plan view of a rotatable knife;

FIG. 5 is a plan view of a fixed knife;

FIG. 6 illustrates the placement of magnets on the magnet strip;

FIG. 7 is a cross-section of a magnet strip on a drum wall, showing the magnet strip along section 7 of FIG. 6;

FIG. 8 is a side view of a magnet cover;

FIG. 11 is a side view of the conveyor and bar screen;

FIG. 16 is a partial cut away side view with a section taken through the drum, illustrating an alternative embodiment of the rotary materials separator, with a section of knives, a section of magnet strips, a section of lifters, a drive mechanism, a ferrous scraper and conveyor, and a glass/grit bar screen and conveyor;

FIG. 17 is a cross-section of another embodiment of a seal chamber on a drum;

FIG. 18 is a cross-section of a lower portion of the other embodiment of the seal chamber on a drum;

FIG. 29 is a side view of the drum illustrating another embodiment of the drive mechanism;

FIGS. 30 and 31 are cross-sections of the drum illustrating the other embodiment of the drive mechanism.

DETAILED DESCRIPTION OF THE PREFERRED EMBODIMENTS

Figure 1:
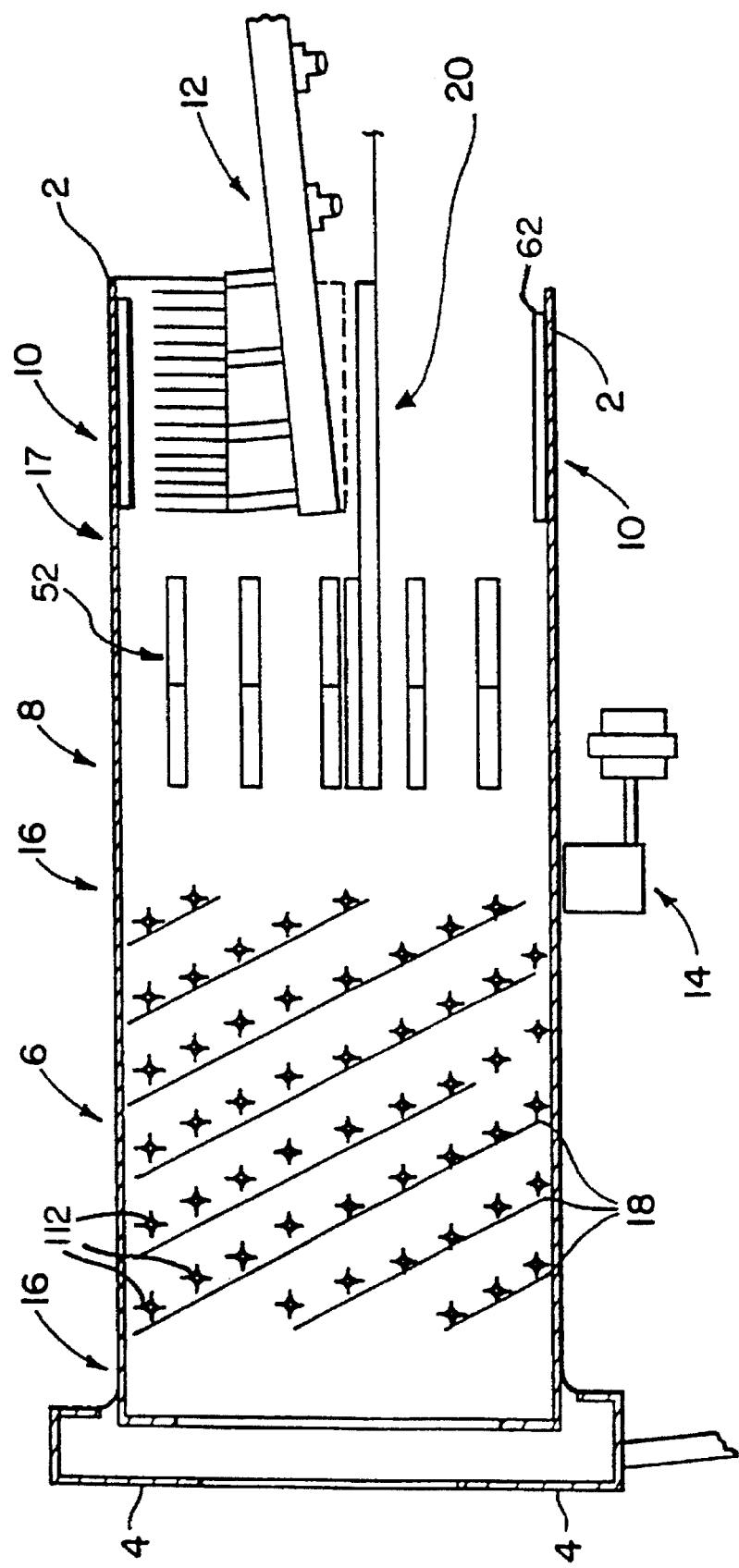
FIG. 1 is a side view with a section taken through the drum.

Referring now to FIGS. 1 and 16, a rotary materials separator in accordance with the present invention comprises a drum 2, a seal chamber 4 over the mouth of the drum, a first interior section 6 of the drum with a plurality of knives 112 and 114, a second interior section 8 of the drum with a plurality of magnet strips, a third interior section 10 of the drum with a plurality of flexible lifters 62, a movable conveyor 12 cantilevered through the exit end of the drum, a scraping device 20, and a drive mechanism 14, preferably contacting the center of the drum.

The first and second sections 6, 8 are preferably separated from each other and from the mouth of the drum 2 by a blank portion of drum wall 16. The blank portion 16 near the drum mouth allows materials to be fed into the drum without interference by the knives in the first section 6. Similarly, the blank portion 16 of drum wall separating the first and second sections 6, 8 allows material to transition without interference from one section to the other, minimizing droppage of materials from the first section 6 into the second section 8. Another blank portion 17 exists between sections 8 and 10. The blank portions 16, 17 are preferably two feet long.

Materials are introduced into the drum 2 via a chute cantilevered into the seal chamber 4. Referring now to FIG. 2, one embodiment of the seal chamber comprises a stationary chamber 22 capable of being fitted over the mouth of the drum; a plate 24 attached to the mouth of the chamber, advantageously having a five-sided aperture 26 for incoming waste; and an opening 28 in a bottom of the seal chamber through which leftover waste material may be swept. The seal chamber 4 is placed adjacent to the mouth of the drum and seals waste from leaking from the end of the drum.

FIG. 3 illustrates an outer section of one embodiment of the stationary chamber 22, the drum 2, and a means for cleaning the stationary chamber, comprising a paddle 30 attached to the wall of the drum 2 and cooperating with the stationary chamber 22 so as to sweep the seal chamber 4 clean as the drum rotates. A rubber seal ring 32 is mounted on the stationary chamber 22 to seal the seal chamber to the drum 2. Leftover waste material is thus swept through the opening 28 in the seal chamber.

Figure 19:
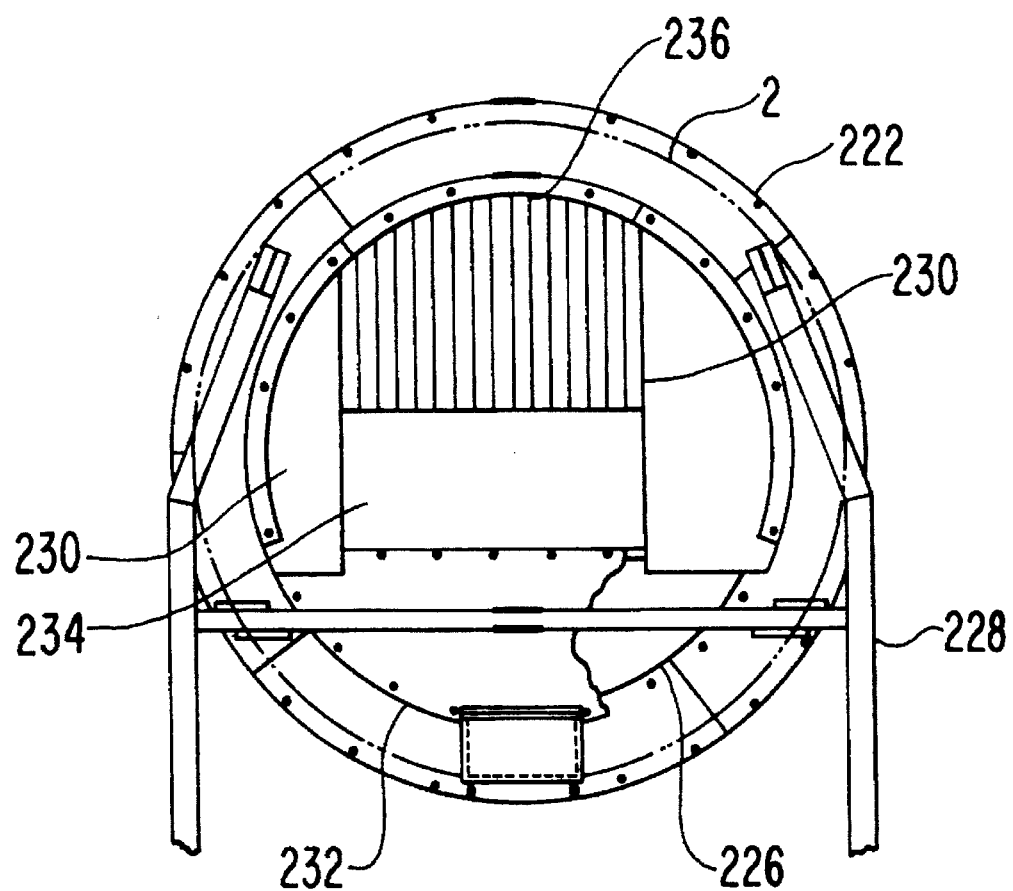
FIG. 19 is an end view of the other embodiment of the seal chamber on a drum.

FIGS. 17–19 illustrate a preferred alternate embodiment of the seal chamber 4. It is desirable to eliminate the need for a chute to introduce materials into the drum 2. That is, if the seal chamber 4 permits a conveyor to directly feed into the drum 2, leakage will be reduced. Moreover, it is desirable for the seal chamber 4 to reduce leakage of materials out of the drum 2. In the preferred embodiment, materials are introduced into the drum via a conveyor 220 cantilevered into the drum 2 through the seal chamber 4. Illustrated in FIG. 17, the seal chamber comprises an outer plate 222 capable of being fitted over the mouth of the drum 2; an inlet cylinder 224 mounted on the outer plate 222 and inserted into the drum 2; and a slide plate 226 mounted inside the inlet cylinder 224. The slide plate 226 encourages waste material to slide into the drum 2. The seal chamber 4 is shown as being supported by a seal support structure 228.

FIG. 18 illustrates an outer section of this embodiment of the seal chamber 4, inserted into the drum 2. In order to reduce leakage, a seal ring 32 seals the drum 2 to the seal chamber 4. The seal ring 32 may be a rubber seal ring, and may be mounted on the outer plate 222.

FIG. 19 further illustrates a preferred embodiment of the seal chamber 4. It is desirable to seal the drum 2 as much as possible, while leaving an entry for the waste material. Thus, a lower plate 232 is mounted on the outer plate 222. The slide plate 226 may advantageously be mounted to the lower plate 232. The lower plate 232 thus seals the lower portion of the drum mouth. To seal the side portions of the drum mouth, a retainer 230 may be placed on each side, mounted on the outer plate 222. The retainers 230 are preferably made of flexible material, such as rubber. A flexible slit curtain 236 provided in the upper portion of the drum mouth serves to further seal the drum mouth, and may be connected to the outer plate 222. Thus, an inlet opening 234 is provided for insertion of the conveyor (not shown). It should be noted that a drive portion of the conveyor 220 may be situated within the seal 4. In order to accommodate varying shapes of conveyors, the retainers 230 and lower plate 232 can be field cut as necessary to enlarge the inlet opening 234.

Figure 23:
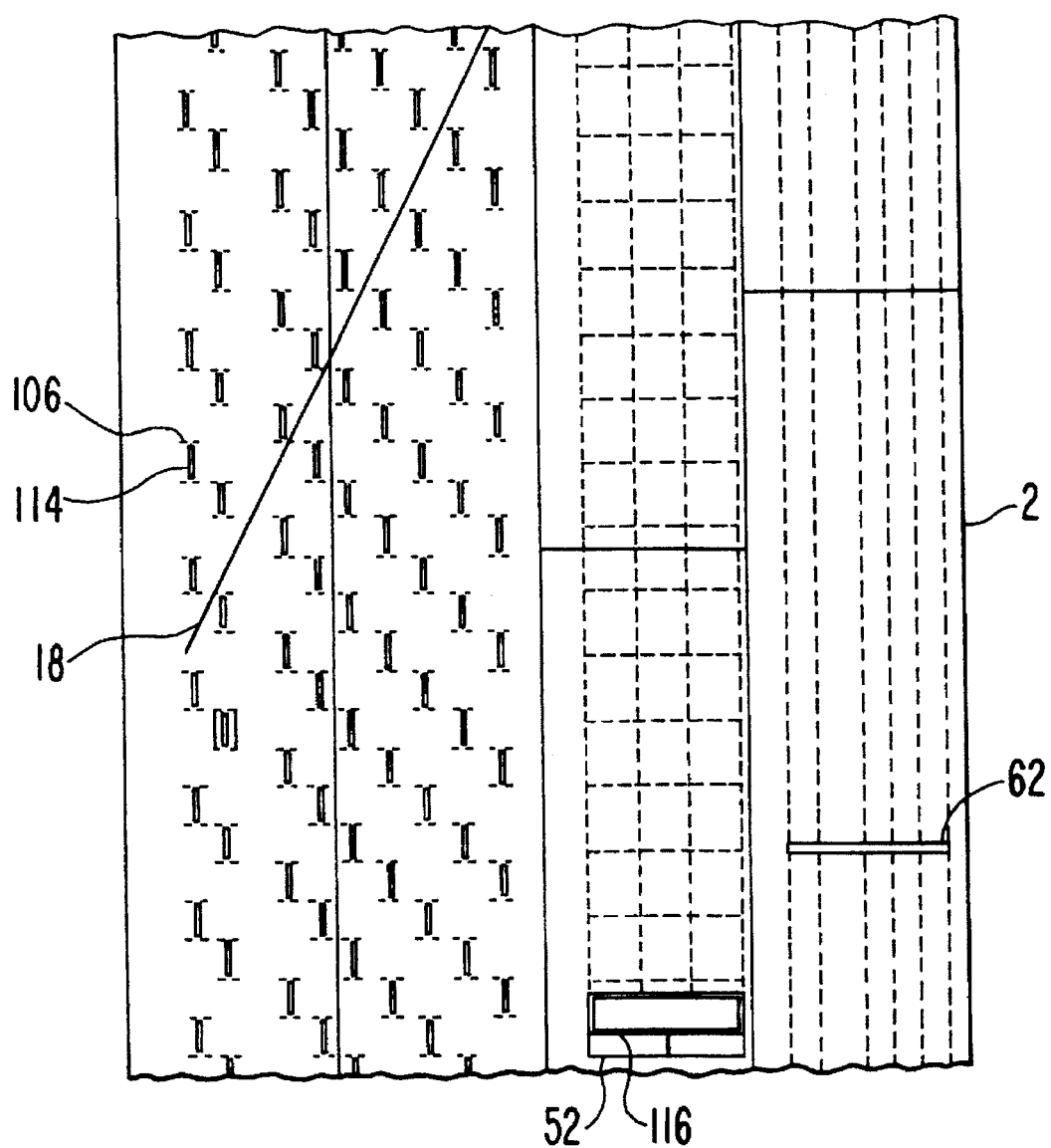
FIG. 23 is a flat view of the drum of the other embodiment of the rotary materials separator, illustrating placement of removable knives, magnet strips, and flexible lifters.

Referring back to FIG. 1, materials inside the seal chamber are passed on to a first section 6 of the drum along which a plurality of knives 112 are attached. In the embodiment shown in FIG. 1 the plurality of knives 112 are positioned linearly along a plurality of lines 18 which forms a reverse spiral when the drum 2 is rotated. The reverse spiral inhibits larger items, such as unopened plastic household garbage bags, from advancing along the drum 2. However, through experimentation it has been discovered that a forward spiral is preferable, since it allows a freer passage of materials through the drum 2. A smaller number of knives 112 also allows freer passage of materials. The forward spiral 18 with fewer knives is illustrated in FIGS. 16 and 23 and is the preferred embodiment. When the bags become opened and emptied, the contents of the bags sieve through spaces between the knives and advance along the drum 2 and out of the first section 6.

FIG. 4 illustrates an embodiment of a knife 112 of the plurality of knives. The knife 112 is approximately X-shaped, and has a leading edge 34 and a trailing edge 36. The edges of the knife 34, 36 are preferably formed of a hardened alloy. The knife may be affixed to the drum by a bolt 38 and a pair of pins 40. When the leading edge 34 becomes dull, the knife may be rotated to bring the sharp trailing edge 36 around to become the leading edge 34. A cross piece 41 and a square gusset 39 may be attached to the knife to counteract bending created by the stream of materials. The knives may be removed from the drum from the inside of the drum, or from the outside through openings in the wall of the drum. FIG. 5 illustrates an alternative embodiment of the knife, which is intended to be welded to the drum.

Figure 20:
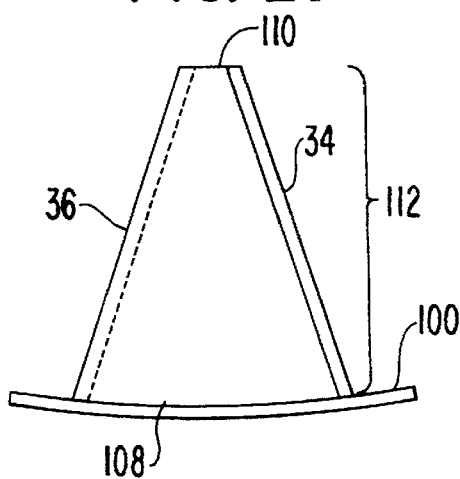
FIG. 20 is a side view of a removable knife.

FIG. 20 illustrates a preferred embodiment of the knife 112. To eliminate having personnel servicing the knives working within the drum 2 in the midst of the knives, the knives 112 are preferably removable from outside the drum 2 through the drum wall. Additionally, the knives 112 have a shape which enhances bag penetration and further permits removal through the drum wall.

Figure 21:
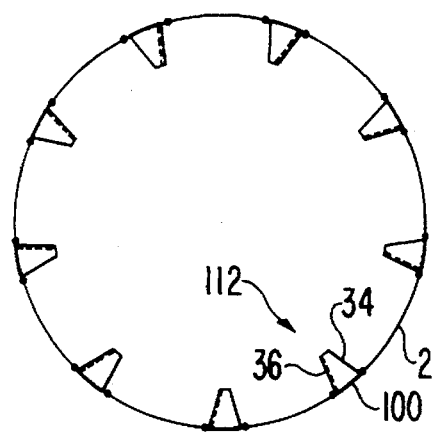
FIG. 21 is a cross-section of the drum illustrating placement of removable knives.

Thus, the knife 112 is broader at a base 108 than at a top 110, being spear shaped. It is provided with a leading edge 34 and trailing edge 36. The knives 112 should be positioned in a manner which enhances bag penetration. Thus, the knives 112 may be positioned so that bags are forced against them when the drum 2 is rotated. In one preferable embodiment, shown in FIG. 21, the knives 112 are perpendicular to the wall of the drum 2, so that bags contact the leading edge of the knife 34 when the drum 2 is rotated.

In order to remove the knives 112 from the outside of the drum 2, the knives 112 should be able to be attached to the exterior of the drum. One manner of doing this is to provide openings in the drum wall in which a knife assembly may be inserted, and to provide knife assemblies which are insertable.

Figure 22:
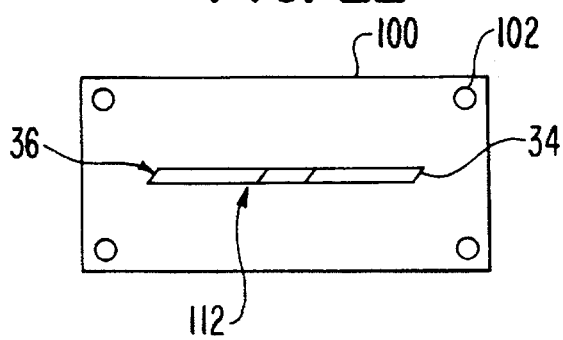
FIG. 22 is a plan view of a removable knife.

FIGS. 20 and 22 illustrate a preferred embodiment of such a knife assembly. A knife assembly includes a knife 112, such as the above-described spear shaped knife, which is attached to a knife base plate 100. The base plate 100 is curved to follow the curvature of the drum wall 2. As shown in FIGS. 16 and 23, the drum wall should have a knife opening 114 in which the knife 112 may be inserted. The knife opening should be large enough to admit the knife 112, while still having a snug fit to prevent accumulation of debris. Thus, it may be slot-shaped.

Figure 24:
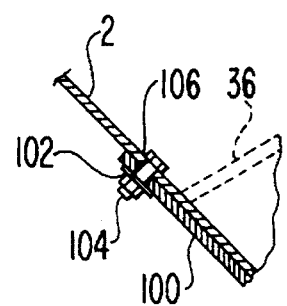
FIG. 24 is a detail of a cross-section illustrating the removable knife connected to the drum.

The knife assembly should include a connection for coupling to the drum wall. One advantageous connection is illustrated in FIGS. 23 and 24. The base plate 100 has a series of openings 102 for accommodating removable fasteners. Assuming that the base plate 100 has a rectangular shape, an opening 102 may be placed at each corner. The drum wall 2 has corresponding openings 106 for accommodating removable fasteners, shown in FIGS. 21 and 23. In the illustrated embodiment, the openings 102, 106 are formed to receive a bolt 104. Other connections for coupling the knife assembly to the drum wall are possible.

Referring back to FIG. 16, materials inside the first section 6 of the drum are passed on to a second section 8 of the drum along which a plurality of magnet strips 52 are attached.

It is preferable to agitate the materials in the drum prior to the waste material being passed on to the second section, if the second section does not sufficiently agitate the materials. Agitation facilitates presentation of ferrous material. An agitator projection 7 is illustrated in FIG. 16, in the blank portion 16 separating the first and second sections and in the blank portion 17 separating the second and third sections.

The structure of the magnet strip is illustrated in FIGS. 6, 7, and 8. The placement of a plurality of magnet flats 46, 48 in the magnet strip 52 is illustrated in FIG. 6. A magnet flat may be, for example, an Yarnoz 8 permanent magnet. The magnet strip is rectangular and has a leading edge 42 and a trailing edge 44. A plurality of permanent magnet flats 46 are placed along the leading edge 42, so that the magnet flats 46 are all oriented with the same magnetic orientation (all with north pointing up or north pointing down). A plurality of permanent magnet flats 48, all oriented so that their magnetic orientation is opposite that of the leading edge magnetic orientation, is placed along the trailing edge 44. A space 50 between the plurality of trailing edge magnet flats and the plurality of leading edge magnet flats is preferably one to one-half times the magnet flat width. This maximizes a distance of a field of influence of the magnet strip while maintaining optimum magnetic attractive force to ferrous objects within the field of influence.

Referring now to FIG. 7, the magnet strip 52 is attached to the inside wall of the drum 2, preferably by more than one bolt 54. A cavity 56 is formed between the wall 2 and the magnet strip 52. Shims (not shown) may be inserted into the cavity 56 to adjust the height of the magnet strips so that the plurality of magnet strips may be brushed by a scraping device with a ferrous product conveyor 132 (shown in FIGS. 26 and 27), thus dropping any materials attracted by the magnet strips onto the conveyor 132 (shown in FIGS. 26 and 27) cantilevered into the drum. The height of the magnet strip 52 is preferably adjusted so that the scraping device 20 (shown in FIG. 1) brushes its surface. A rectangular shield 58, preferably made from a thin lead sheet, is mounted over the magnet flats 46, 48. The shield 58 provides an impact cushion which absorbs shocks from tumbling items in the stream of materials during drum rotation, minimizing breakage of the magnet flats. A magnet cover is placed on top of the shield 58 and has flanges 60 folded from the main body 59 around the magnet flats 46, 48. FIG. 8 is a side view of the magnet cover showing the main body 59, and flanges 60.

Reference is made again to FIG. 16. It has been found in practice that certain materials such as paper, plastics, and textiles tend to become stuck between the magnet strip 52 and ferrous material attracted to the magnet. This occurs, for example, when a plastic bag is stuck between a can and the magnet strip 52. The material thus stuck will become draped over the scraping device 20 when the ferrous material is lifted up and scraped off. It has also been discovered that the scraping of the scraping device 20 across the magnet strips 52 and resulting bouncing action produces a great deal of wear and tear on the scraping device. Therefore, it is advantageous to include fill plates 116 between the magnet strips 52. The fill plates 116 can be made of many different kinds of materials, such as plastic, non-magnetic metal or steel. The fill plates 116 should be of a size and shape which approximately fills in the space between the magnet strips 52, and as high as the magnet strips. In the illustrated embodiment, the fill plates 116 are rectangular.

It has further been discovered that some agitation in the second section is desirable. The use of fill plates 116, however, allows material to slide around and not be agitated. Therefore, there must be provided some additional features to agitate materials in the second section. The removal of some of the fill plates 116 provides for agitation. It has been found that removal of every other fill plate 116, so that a blank space 119 alternates with a fill plate 116, creates adequate agitation, although more or less numbers of blank spaces can be used.

The blank space 119 would cause wear and tear to the scraping device 20, as discussed above. Therefore, it is desirable to provide a way to prevent bouncing of the scraping device 20 caused by the blank space 119. One or more runners 118 in the blank space 119 are one way of keeping the scraping device 20 at the level of the magnet strips 52 so that it does not bounce. The runner 118 should be wide enough that it does not rub a groove into the scraping device 20. Thus, the runner may advantageously be three inches wide. The runners 118 should also be positioned so that they are scraped by alternate positions along the scraping device 20 to minimize wear and tear on the scraping device 20. The combination of the blank spaces 119 with the agitator projection 7 has been found to create sufficient agitation.

A scraping device, 20, shown in FIG. 16, is cantilevered into the drum to scrape ferrous materials from the magnet strips, which materials then fall onto a conveyor (132 FIG. 25) for transport out of the drum 2. It must be long wearing, since it will continuously be scraping while the separator is in use. Also, since light materials such as paper or plastic sometimes are stuck with the ferrous materials, as described above, it must be able to sort the light materials from the ferrous materials.

Figure 25:
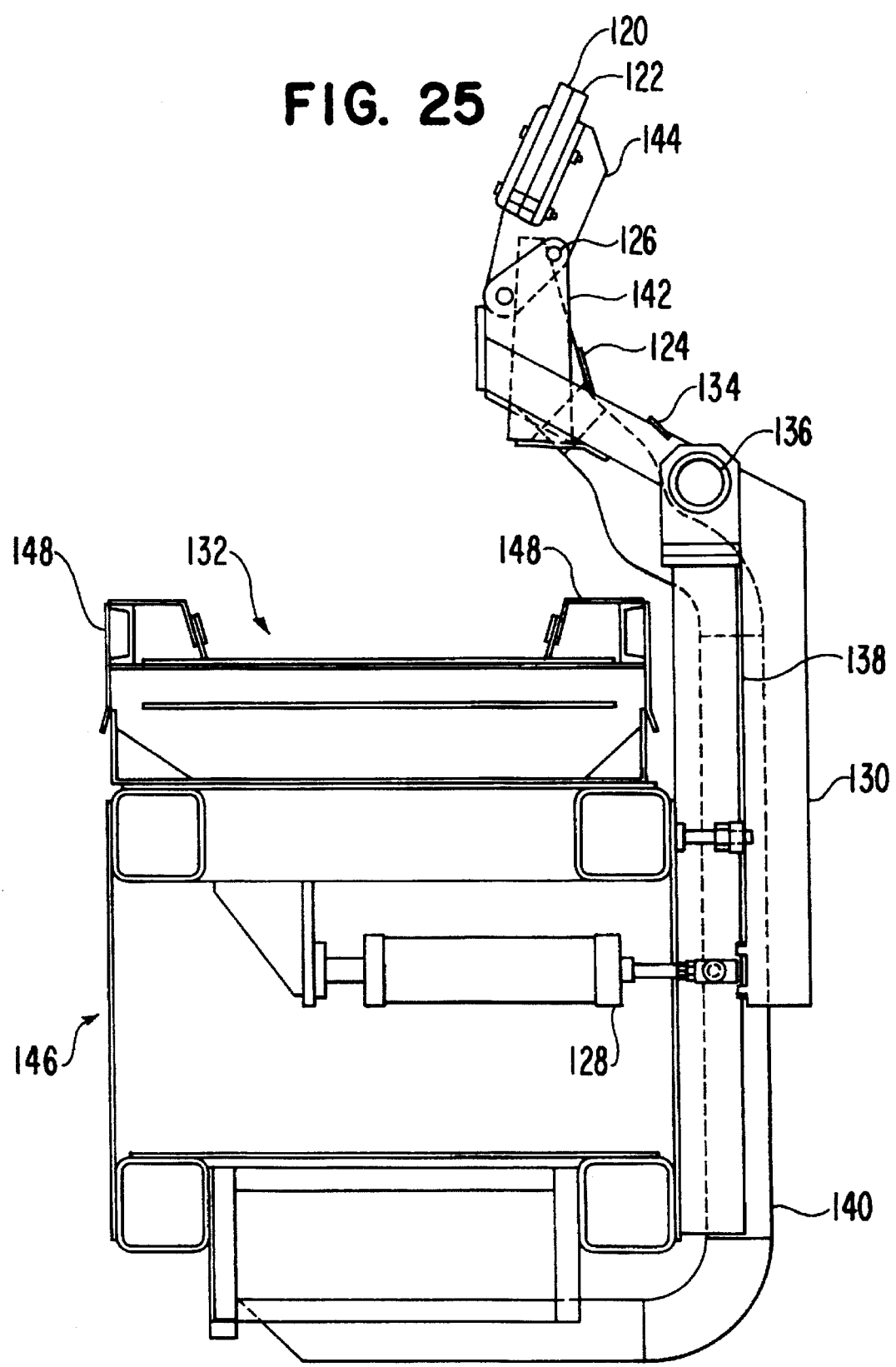
FIG. 25 is an exit end view of an alternative embodiment of a ferrous scraper, air knife and conveyor.

Reference is made to FIG. 25. The removal of the ferrous materials to outside the drum may advantageously be accomplished with the ferrous product conveyor 132. The ferrous conveyor 132 may be a commercially available conveyor belt. It is advantageous for the ferrous conveyor 132 to have sides 148, which act to retain the ferrous materials on the conveyor 132. The sides 148 are advantageously sloped inward.

It is also advantageous to place the ferrous conveyor 132 on a frame 146. Moreover, other elements of the scraping device 20 can be placed on the frame 146. This allows the scraping device 20 to be easily positioned in the drum 2.

In order to remove ferrous materials from the magnet strips, the scraping device 20 should include a scraper member positioned against the magnet strips over the conveyor 132. Moreover, the scraper member should be made of a material which can scrape off smaller ferrous materials, such as can lids. Thus, the scraper member may be a first strip 120 running approximately the length of the second section. The first strip 120 may be made of a laminate of soft material, for example, conveyor belt material. However, depending on the type of materials in the waste stream, other harder or softer materials may work well. The first strip 120 may be backed by a second strip 122 of harder material, for better performance. The harder material could be, for example, ultra high molecular weight (UHMW) plastic, or other commercially available material. Since the first strip 120 tends to wear down as it is used, it is preferable that the first strip 120 be reversible to allow for more complete use.

The scraper member should be supported over the conveyor 132 so that ferrous material which is scraped off lands on the conveyor 132. Thus, it should be positioned on the far side of conveyor 132 with respect to the direction of rotation of drum 2. The scraper member is advantageously connected to the frame 146. Also, since the scraper member becomes worn during use, it is desirable to advance the material of the scraper member to maintain its correct positioning vis a vis the magnet strips. Thus, the scraper member may be on a spring-loaded arm 130 which pivots over the frame 146. A pivot point 136 on the frame 146 may be made on a support member 138 connected to the frame. To provide the spring-loaded action, an air cylinder 128 may be connected to the frame 146, pushing against a lower portion of the arm 130. The arm 130 may be vertical and further include an angled section 134, and an upper section 142, to provide proper positioning.

Figure 26:
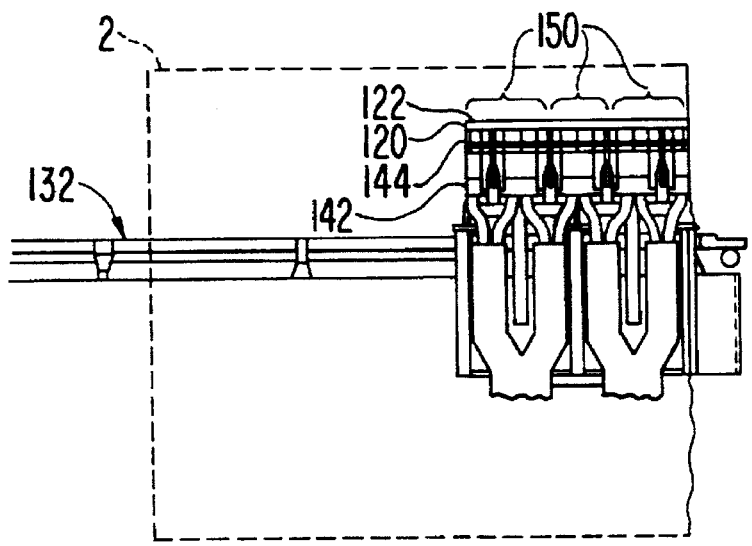
FIG. 26 is a side view of the ferrous scraper, air knife and conveyor.

To allow for continued operation even when jammed, the scraping device 20 may include sections 150 which can break away. Reference is made to FIG. 26, showing the upper section 142, the first and second strips 120, 122 and an upper mounting 144 constructed in three break-away sections 150. Reference is made back to FIG. 25. The upper mounting 144 is connected to the arm 130 by a connection which will break away when a load on it exceeds an allowable limit, such as during jamming. In the illustrated embodiment of FIG. 25, a shear pin 126 provides such a connection in each break-away section 150.

Less dense materials, such as paper, may be cleared from the ferrous materials after the materials are scraped from the magnet strips. One preferable way of separating light materials from the heavier ferrous materials is by blowing air, which tosses light materials much farther than heavier materials. Thus, as shown in FIG. 25, an air knife 124 is preferably positioned in the scraping device 20 below the first strip 120. To reduce dust discharge, air blown through the air knife 124 is advantageously recycled from the exit of the drum 2 via air knife ducts 140.

Figure 27:
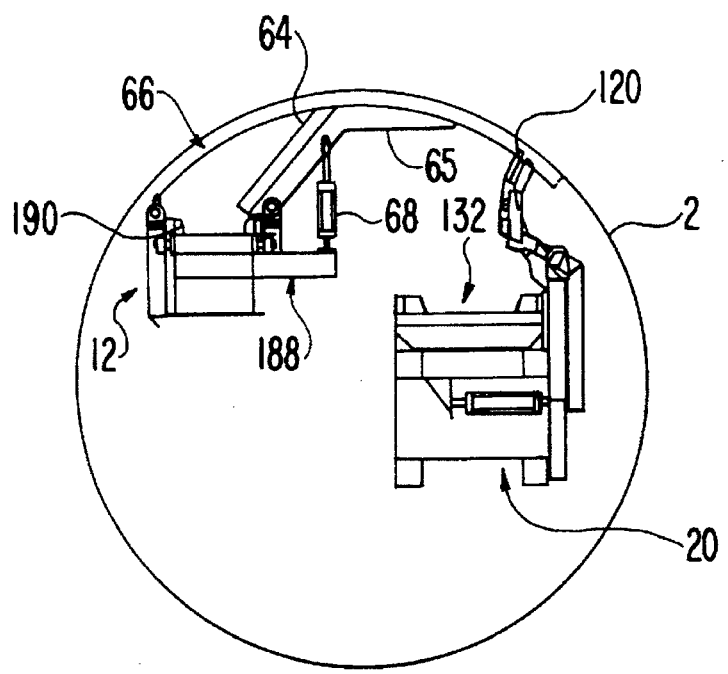
FIG. 27 is an exit end view of the ferrous scraper, ferrous conveyor, and another embodiment of a bar screen and glass/grit conveyor.

It has been found that placement of the scraping device 20 in the drum 2 affects the efficiency of the separator. It is thus preferable to place the scraping device higher in the drum 2, as shown in FIG. 27, to allow ferrous materials to drop freely away from the drum 2. An angle of approximately 60 degrees from a horizontal for the first strip 120 is preferable.

Referring back to FIG. 1, materials inside the second section 8 of the drum 2 are passed on to a third section 10 of the drum 2 along which a plurality of flexible lifters are attached.

Figure 9:
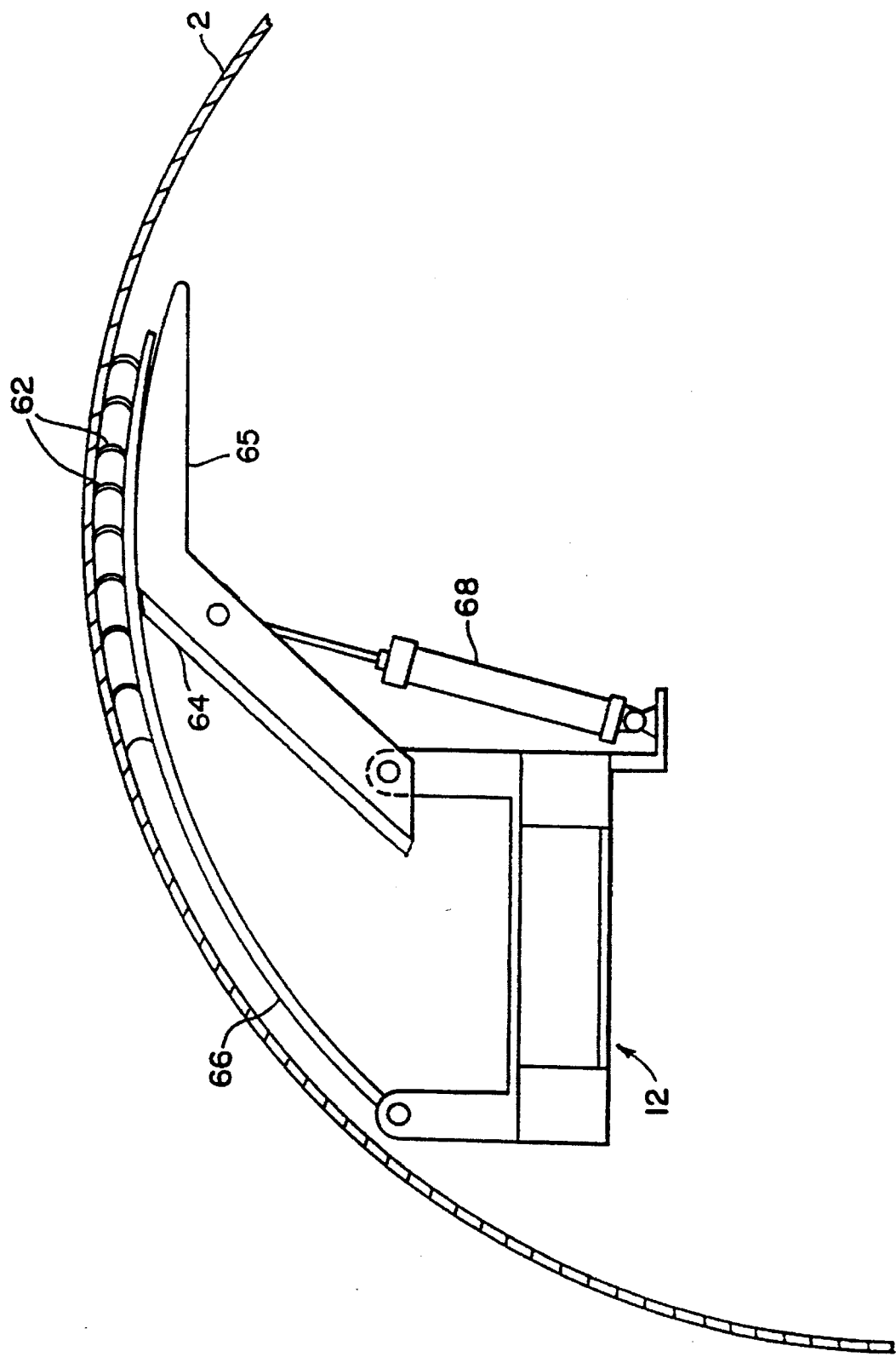
FIG. 9 is an exit end view of the movable conveyor inside a section of a drum.
Figure 10:
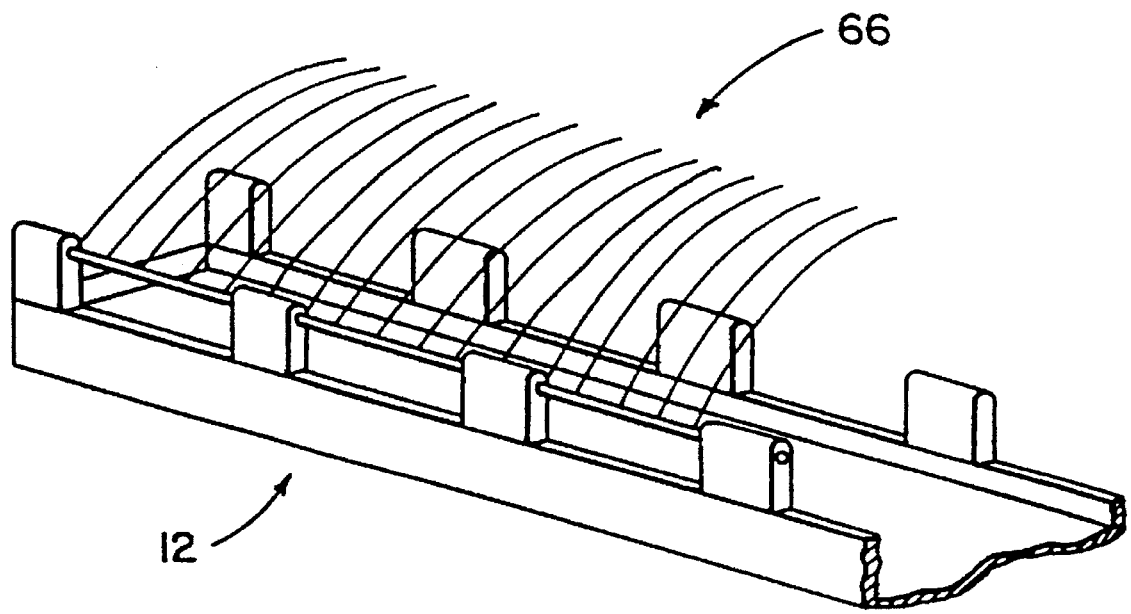
FIG. 10 is a perspective view of the bar screen on the conveyor.

FIG. 9 is a section of the drum from the exit end of the third section showing the lifters 62 and the movable conveyor 12. The conveyor 12 is mounted on a movable carriage 76 (shown in FIG. 11) cantilevered into the exit end of the drum 2. The carriage allows the conveyor 12 to move away from the drum wall 2. A bar screen 66 is pivotally mounted to a side of the movable conveyor 12 next to the drum wall 2. The bar screen 66 is curved to follow the drum wall 2. A slide backstop 64 is attached to slide bracket 65 which is pivotally attached to a side of the movable conveyor 12 away from the drum wall 2. The slide bracket 65 may be approximately L-shaped. The bar screen 66 extends from the conveyor up and over the conveyor to rest on the slide bracket 65. The slide bracket 65 is held near the drum wall 2 by a pneumatic cylinder 68, pivotally mounted on the conveyor 12 and the bracket 65. Thus, when large materials, such as wood pallets, are lifted by the lifters 62, the conveyor 12 and the bracket 65 are moved away from the drum wall 2 sufficiently to permit the large materials to pass up and over the conveyor 12 and the bar screen 66, the large materials later falling back down into the waste stream. FIG. 10 is a perspective view of the bar screen 66 on the conveyor 12.

Referring now to FIG. 11, the bar screen 66 comprises a plurality of bars 70 curved to follow the inner curvature of the wall of the drum 2 and connected to a pivot bar 72 parallel with the axis of the drum 2, and may be made of square or round steel bar or tubing. The distance between the bars 70 is preferably one half to two inches. The bar screen 66 is formed to follow the contour of the inner wall of the drum 2. The bar screen 66 is pivotally attached to and positioned over the conveyor frame 12. A frame of the conveyor 12 rests on a plurality of rollers 74 on the carriage 76 such that the conveyor may be displaced in a direction perpendicular to the drum's axis of rotation. The bar screen 66 cooperates with the flexible lifters so that oversized materials are kept out of the sorted materials on the conveyor 12, and the bar screen 66 flexes the lifters causing them to self-clean and conversely cleaning the bar screen.

It has been found in practice that several improvements can be made to the bar screen 66. The use of pipes to form the bars 70 creates an opening between the bars with shoulders, due to the round cross-section of the pipes. The shoulders allow material to fall partially into the opening, forming a bridge between the shoulders. The bridge in turn tends to collect other materials, until the opening between the bars 70 is closed up. Moreover, steel pipes, which are hollow, tend to wear thin. Thus, it is preferable for the bars 70 to have a square cross-section, and to be solid rather than hollow. Therefore, square solid bars should be used for the bars 70.

Figure 28:
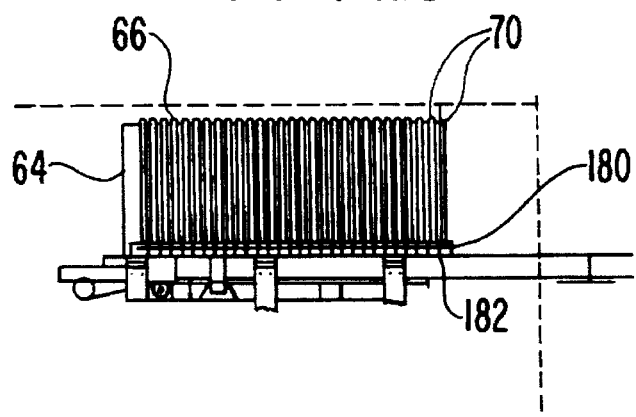
FIG. 28 is a side view of the other embodiment of the bar screen.

Also, it is desirable to vary the size of materials removed from the waste stream. This can be accomplished if the spacing between the bars is adjustable. Reference is made to FIG. 28. Each bar 70 may be connected to a collar 180, through which the pivot bar 72 is inserted. A space 182 between two of the collars 180 can be adjusted by inserting a spacer therein. The most desirable spacing between the bars 70 is dependent on the material in the waste stream, but is generally between one-half to two inches. Although other spacings can be used, one and one quarter inches is the most frequent spacing.

Ideally, glass and grit in the waste stream would drop straight down through the bar screen 66, shown in FIGS. 27 and 28. However, the rotation of the drum imparts a trajectory to the materials. Thus, the materials must be directed to the conveyor 12. A backstop 64 stops the material and directs it to the conveyor 12. The backstop 64 may be formed of a sheet, for example of metal, which lays over the bracket 65. The backstop 64 has a relatively steep angle, to encourage materials to fall down into the conveyor.

FIG. 27 is another illustration of a preferred embodiment of the bar screen 66. In this embodiment, the bracket 65 is held near the drum wall 2 by a pneumatic cylinder 68 having a vertical action. To provide the vertical action, the pneumatic cylinder 68 is supported by a support member 188 connected to the frame of the conveyor 12. The vertical action more positively supports the bar screen 66 and corrects a previous design weakness.

In a prior design for a rotary material separator, the conveyor 12 was a slider bed takeout conveyor. This unfortunately was not completely effective in removing glass, grit and dirt. Therefore, it has been determined that more positive removal of collected glass, grit and dirt is desired. A commercially available drag chain conveyor provides the necessary removal, and thus is preferable. Also, a wider bed on the conveyor 12 is preferable, in order to catch more of the materials. The conveyor 12 may include walls 190 sloped inwardly, to direct materials away from the edges of the conveyor 12.

In order to further separate oversized materials from the glass, grit and dirt, a screen (not illustrated) may be placed at a discharge end of the conveyor 12. A grizzly screen comprised of a series of inclined parallel bars would allow smaller materials to fall through, thus separating oversized materials.

Both the ferrous conveyor 132, shown in FIG. 26, and the movable conveyor 12, shown in FIG. 16, have a slope which approximately matches the slope of the drum 2. The corresponding scraping device 20 and bar screen 66 also have a slope which approximately matches the slope of the drum. Earlier conveyors were approximately horizontal and did not match the slope of the drum, thus the corresponding scraping device 20 and bar screen 66 were constructed at an angle to the conveyors 132, 12. It is more expensive to construct the conveyors 132, 12 at an angle to the corresponding scraper 20 and bar screen 66. Therefore, it is preferable to have the conveyors 132, 12, and the corresponding scraping 20 and bar screen 66 parallel to each other, matching the slope of the drum, to be less expensive to construct.

Figure 12:
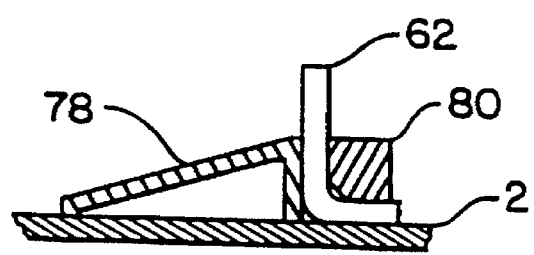
FIG. 12 is a cross section of a flexible lifter on a drum wall.

FIG. 12 illustrates a preferred method of attaching the flexible lifters 62. A first ramp 78 is attached to the drum wall 2, preferably by welding. The flexible lifter 62 is clamped to the wall of the drum 2 and the first ramp 78 by a bar 80 placed over one end of the lifter 62 and bolted to the drum wall 2 adjacent to the first bar 78. The lifter 62 thus extends from the drum wall 2, preferably at a right angle. This particular clamping method prevents the lifters from being torn out during use.

The agitator projection 7 (FIG. 16) in the blank space between the first and second sections may advantageously be of steel. It has been discovered that four such agitator projections 7, extending 3" to 6" into the interior of the drum, equally spaced, are adequate. Such an embodiment is illustrated FIG. 16.

Figure 13:
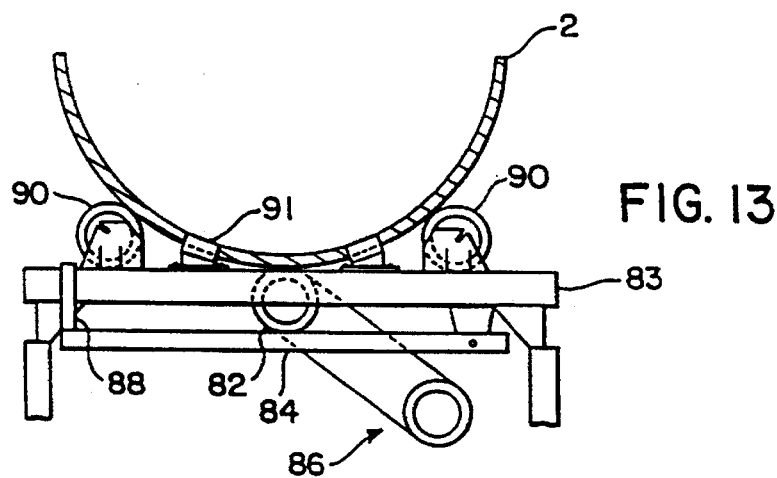
FIG. 13 illustrates the central drive wheel for rotating the drum.
Figure 14:
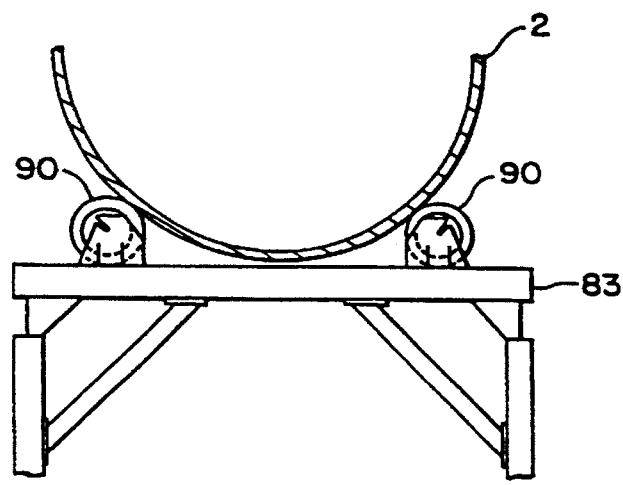
FIG. 14 illustrates a pair of idler wheels for use with the drive wheel.
Figure 15:
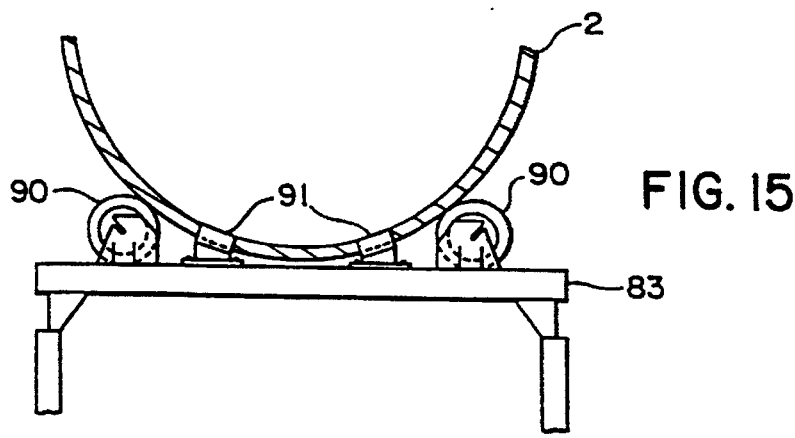
FIG. 15 illustrates a pair of idler wheels with thrust rollers.

As illustrated in FIG. 13, the drum 2 is driven by a central drive wheel 82 in contact with the center of the drum 2. A band may be fixed around the center of the drum 2 for contact with the drive wheel 82 to provide structural strength and to reduce wear on the drum. The central drive wheel 82 is mounted on a lift 84 and may be driven by a drive chain or belt 86 on a motor. The lift 84 is a rectangular flat member pivotally connected to a frame 83 placed under the drum 2. The lift 84 holds the central drive wheel against the center of the drum by pneumatic pressure, preferably provided by a pneumatic system 88 mounted above the lift 84. The pneumatic pressure is adjustable allowing greater pressure to be applied at startup and less pressure during rotation, thus decreasing wear on the drum and drive wheel. The frame 83 and the lift 84 may be tilted at a slight angle so that the drum 2 is also tilted. A plurality of pairs of idler wheels 90, are mounted on the frame 83. Preferably one pair of idler wheels is placed at the center of the drum, one pair near the exit end, and one pair near the feed end, for a total of six idler wheels. FIG. 14 illustrates a pair of idler wheels 90 at the exit end of the drum 2. FIG. 15 illustrates an alternative embodiment of the idler wheels 90, which can advantageously be used as the pair of idler wheels near the exit end of the drum 2. A pair of thrust rollers 91 are preferably mounted on the frame near the middle and exit, and are used to longitudinally position the drum 2 on the frame.

FIGS. 29 and 30 illustrate the preferred embodiment of a drive mechanism for driving the drum 2. A drive mechanism with more positive drive action, which is also longer wearing, is desirable. Therefore, it is preferable to utilize a drive chain 214, which drives a sprocket 208 attached to and surrounding the drum 2. A chain drive mechanism 210 drives the drive chain 214. The drive chain 214 may be a cradle type with oil bath. The sprocket 208 may easily be constructed in a plurality of segments, which are then connected to the drum 2. The drive chain 214 is longer wearing than the central drive wheel 82, which drives the drum 2 by friction. As illustrated in FIG. 29, the drive chain 214 and sprocket 208 are preferably situated at approximately the center of the drum 2.

As a preferable alternative to six idler wheels 90, the drum 2 may rest on trunions 202, to provide better wear properties. As illustrated in FIGS. 29 and 31, a pair of trunions 202 are placed near the exit end of the drum 2, and a pair of trunions 202 are placed near the feed end of the drum 2. The trunions 202 should be of a material with excellent wear properties, and with great load bearing capacity, for example, of machined steel. Since the trunions 202 have greater load bearing capacity than idler wheels 90 which include rubber, there need only be provided two pairs. To further provide better wear properties, a ring 200 should be placed around the drum 2 at a location which will contact the trunions 202. Since the ring 200 will be used with steel trunions 202, it should be made to closer tolerance, have better wear properties, and have closer structural integrity. Therefore, the ring 200 may advantageously be made of machined forged steel. The combination of machined forged steel rings 200 with machined steel trunions 202 has been found to provide a smooth rotational action to the drum 2.

Figure 32:
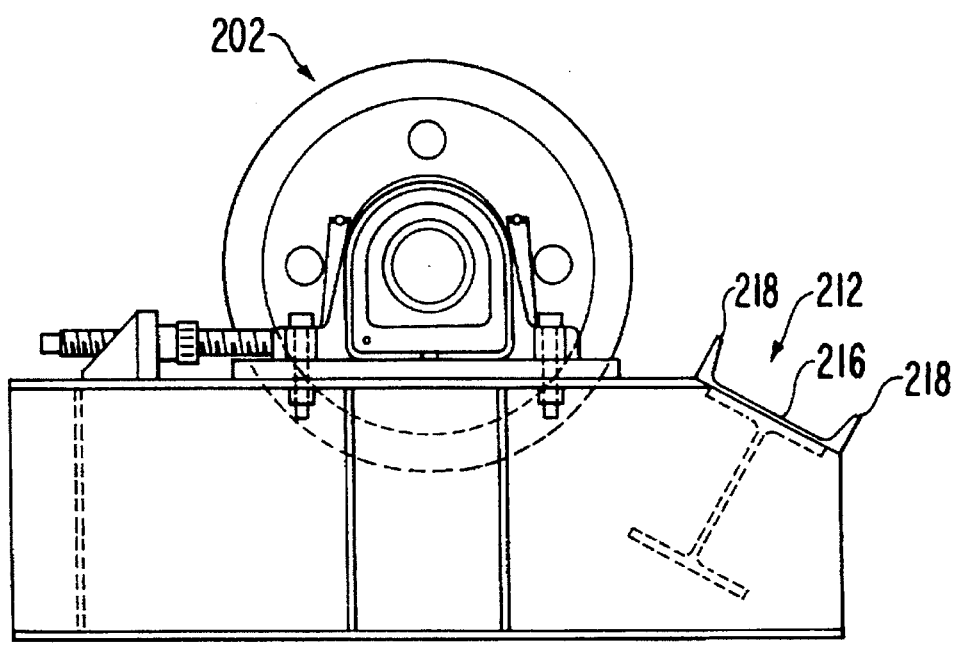
FIG. 32 is an end view of a trunion and drum jacking point.

In practice, the drum may need to be jacked up and lifted, such as during maintenance. Since the jacks, placed in pairs between the sides of the drum 2 and the frame 83, are not radial to the drum, this can be a very dangerous practice. Therefore, the rotary material separator should be provided with drum jacking points which provide a surface for angling a jack to be radial to the drum. Reference is made to FIGS. 31 and 32. A drum jacking point 212 is incorporated into the trunion assembly 202. The drum jacking point includes a jack surface 216, angled toward the drum 2, on which a jack may be securely placed. In order to further secure the jack, the drum jacking point should also include shoulders 218. Since the drum jacking point 212 is incorporated into the trunion assembly 202, the jack would meet radial to the ring 200. Thus, the drum 2 can be safely and securely lifted.

Reference is made to FIG. 29 and FIG. 31. In the illustrated embodiment, the thrust rollers 91 act as restraining wheels, to keep the drum 2 from sliding forward. One thrust roller 91 is provided for one or both of the two rings 200. Since any point on the ring 200 at a different distance from the center has a different rotational speed, the thrust roller 91 should have an angled face 219 to account for this difference. The thrust rollers 91 may be positioned so that only one is active, and the other one acts as a backup. This is accomplished by positioning one of the thrust rollers 91 slightly off of the ring 200.

While specific embodiments of the invention have been described and illustrated, it will be clear that variations in the details of the embodiments specifically illustrated and described may be made without departing from the true spirit and scope of the invention as defined in the appended claims.

What is claimed is:

1. A rotary materials separator comprising:
    (A) a hollow drum open at both ends, to be rotated around a cylindrical axis, having on the inside of the wall of the drum a first section, a second section, and a third section;
    (B) a plurality of knives extending from the first section;
    (C) a plurality of adjustable magnet strips on the second section; a scraping device cantilevered into the second section;
    (D) a plurality of extensions extending from the third section; a movable conveyor cantilevered into the third section;
    (E) a seal chamber, positioned over the feed end of the drum; and
    (F) a drive mechanism, positioned to rotate the drum,
    wherein the wall of the drum has knife openings formed therein, and at least one knife of the plurality of knives is insertable into the knife opening and removable from the outside of the drum, further comprising a knife base plate on the knife, and at least one fastener for connecting the knife base plate to the wall of the drum.

2. A rotary materials separator as in claim 1, wherein the plurality of knives are positioned in a plurality of lines forming a forward spiral when the drum is rotated.

3. A rotary materials separator comprising:
    (A) a hollow drum open at both ends, to be rotated around a cylindrical axis, having on the inside of the wall of the drum a first section, a second section, and a third section;
    (B) a plurality of knives extending from the first section;
    (C) a plurality of adjustable magnet strips on the second section; a scraping device cantilevered into the second section;
    (D) a plurality of extensions extending from the third section; a movable conveyor cantilevered into the third section;
    (E) a seal chamber, positioned over the feed end of the drum; and
    (F) a drive mechanism, positioned to rotate the drum, wherein each magnet strip is separate from the next magnet strip by a blank space; at least one runner is connected to the wall in at least one of the blank spaces between the magnet strips; and a fill plate is connected to the wall in the remaining blank spaces between the magnet strips.

4. A rotary materials separator comprising:
    (A) a hollow drum open at both ends, to be rotated around a cylindrical axis, having on the inside of the wall of the drum a first section, a second section, and a third section;
    (B) a plurality of knives extending from the first section;
    (C) a plurality of adjustable magnet strips on the second section; a scraping device cantilevered into the second section;
    (D) a plurality of extensions extending from the third section; a movable conveyor cantilevered into the third section;
    (E) a seal chamber, positioned over the feed end of the drum; and (F) a drive mechanism, positioned to rotate the drum, further comprising a blank portion positioned between the first section and the second section; and at least one agitator projection connected to the inside of the drum wall in front of the second section.

5. A rotary materials separator as in claim 4, the magnet strip being rectangular shaped, wherein the magnet strip further comprises a plurality of permanent magnet flats, the magnet flats being positioned on the strip so that all of the magnet flats at the leading edge have the same orientation, and all of the magnet flats at the trailing edge have the opposite orientation; the plurality of flats being covered with a shock absorbing shield; the magnet strips being adjustable by insertion of shims into a cavity defined by the drum wall interior and side of the magnet strip placed on the drum wall.

6. A rotary materials separator as in claim 4, the seal chamber further comprising:
 (A) a stationary chamber;
 (B) a paddle affixed to the drum, thereby sweeping the stationary chamber when the drum rotates; and
 (C) an opening formed in the stationary chamber, through which materials inserted into the drum may be swept.

7. A rotary materials separator as in claim 4, the extension further comprising a lifter; a ramp mounted on the drum, for clamping the lifter to the drum; and a bar affixed to the drum, clamping the lifter between the ramp, drum and bar, such that the lifter is extended at an angle away from the drum.

8. A rotary materials separator as in claim 4, the drive mechanism further comprising:
 (A) a first sprocket formed on the exterior of the drum;
 (B) a chain drive mechanism;
 (C) a second sprocket driven from the chain drive mechanism, driving the first sprocket;
 (D) a ring formed around at least one portion of the exterior of the drum; and
 (E) at least one trunion, positioned below the ring, supporting the ring.

9. A rotary materials separator as in claim 8, the trunion further comprising a drum jacking point.

10. A rotary materials separator as in claim 8, further comprising a thrust roller with angled face, placed in back of at least one of the rings.

11. A rotary materials separator comprising:
 (A) a hollow drum open at both ends, to be rotated around a cylindrical axis, having on the inside of the wall of the drum a first section, a second section, and a third section;
 (B) a plurality of knives extending from the first section;
 (C) a plurality of adjustable magnet strips on the second section; a scraping device cantilevered into the second section;
 (D) a plurality of extensions extending from the third section; a movable conveyor cantilevered into the third section;
 (E) a seal chamber, positioned over the feed end of the drum; and
 (F) a drive mechanism, positioned to rotate the drum, further comprising a blank portion positioned between the first section and the second section; and at least one agitator projection connected to the inside of the drum wall in front of the third section.

12. A rotary materials separator comprising:
 (A) a hollow drum open at both ends, to be rotated around a cylindrical axis, having on the inside of the wall of the drum a first section, a second section, and a third section;
 (B) a plurality of knives extending from the first section;
 (C) a plurality of adjustable magnet strips on the second section; a scraping device cantilevered into the second section;
 (D) a plurality of extensions extending from the third section; a movable conveyor cantilevered into the third section;
 (E) a seal chamber, positioned over the feed end of the drum; and
 (F) a drive mechanism, positioned to rotate the drum,
 the scraping device further comprising a ferrous product conveyor; an arm, pivotally cantilevered from the conveyor; a first strip connected to an end of the arm, to scrape the magnet strips; and an air knife positioned to discharge air at materials scraped from the magnet strips.

13. A rotary materials separator as in claim 12, the arm further comprising:
 (A) an upper mounting formed from a plurality of break away sections;
 (B) the first strip formed in a plurality of strip sections, each strip section connected to each break away section;
 (C) an upper section;
 (D) a lower section;
 (E) a breakable connector connecting each break away section to the upper section.

14. A rotary materials separator comprising:
 (A) a hollow drum open at both ends, to be rotated around a cylindrical axis, having on the inside of the wall of the drum a first section, a second section, and a third section;
 (B) a plurality of knives extending from the first section;
 (C) a plurality of adjustable magnet strips on the second section; a scraping device cantilevered into the second section;
 (D) a plurality of extensions extending from the third section; a movable conveyor cantilevered into the third section;
 (E) a seal chamber, positioned over the feed end of the drum; and
 (F) a drive mechanism, positioned to rotate the drum, wherein the seal chamber further comprises an inlet cylinder; an outer plate, connected to the inlet cylinder; a lower plate and retainer, connected to the outer plate, forming an inlet opening therebetween; and a slide plate, positioned within the inlet cylinder, connected to a portion of the seal chamber.

15. A rotary materials separator comprising:
 (A) a hollow drum open at both ends, to be rotated around a cylindrical axis, having on the inside of the wall of the drum a first section, a second section, and a third section;
 (B) a plurality of knives extending from the first section;
 (C) a plurality of adjustable magnet strips on the second section; a scraping device cantilevered into the second section;
 (D) a plurality of extensions extending from the third section; a movable conveyor cantilevered into the third section;
 (E) a seal chamber, positioned over the feed end of the drum; and
 (F) a drive mechanism, positioned to rotate the drum; and (G) a bar screen positioned over the movable conveyor, the bar screen including a pivot bar; a plurality of curved bars variably spaced apart, connected to the pivot bar, positioned over the conveyor; a slide bracket with pneumatic return, over which at least a portion of the horizontal bars are positioned, rotatably connected to the conveyor and holding the curved bars near the wall of the drum; and a vertically positioned return, connected between the slide bracket and the conveyor support frame.

16. A rotary materials separator as in claim 15, further comprising a slide connected to the slide bracket, positioned in a line of a trajectory taken by materials falling from the lifters.

17. Method of separating materials, comprising the steps of:

(A) placing a stream of materials into a seal chamber fitted over a rotating hollow drum;

(B) passing the stream of materials from the seal chamber into the drum;

(C) passing the stream of materials through a first section of the drum, the first section having a plurality of knives such that garbage bags in the stream are opened by the knives before progressing;

(D) lifting and separating ferrous materials from the stream by passing the stream of materials through a second section of the drum, the second section containing magnet strips for attracting and lifting ferrous materials as the drum rotates; and placing the metal materials onto a means for conveying such material out the exit of the drum;

(E) lifting and separating glass, grit and dirt from the stream of materials by passing the stream through a third section of the drum; dropping the lifted smaller items onto a means for conveying from the exit of the drum; and (F) discharging the remaining stream of materials from the exit of the drum.

18. A rotary materials separator comprising:

(A) a rotatable hollow drum open at both ends, having on the inside of the wall of the drum a first section, a second section, and a third section;

(B) a plurality of knives extending from the first section, the knives being removable from the outside of the drum through the wall of the drum;

(C) a plurality of adjustable magnet strips on the second section, the magnet strips being adjustable by insertion of shims into a cavity defined by the drum wall interior and side of the magnet strip placed on the drum wall;

(D) a plurality of extensions on the third section, the extensions being clamped to the drum wall between a ramp and a bar mounted on the drum and being extended at an angle away from the drum by the bar affixed to the drum; and (E) a seal chamber positioned over the mouth of the drum; a paddle affixed to the drum whereby the paddle sweeps the seal chamber when the drum is rotated.

19. A rotary materials separator comprising:

(A) a rotatable hollow drum open at both ends, having on the inside of the wall of the drum a first section, a second section, and a third section;

(B) a plurality of knives extending from the first section, the knives being removable from the outside of the drum through the wall of the drum;

(C) a plurality of adjustable magnet strips on the second section, the magnet strips being adjustable by insertion of shims into a cavity defined by the drum wall interior and side of the magnet strip placed on the drum wall; each magnet strip being separated from the next magnet strip by a blank space; at least one runner being connected to the wall in at least one of the blank spaces between the magnet strips; at least one agitator projection being connected to the inside of the drum wall in front of the second section; a fill plate being connected to the wall in the remaining blank spaces between the magnet strips;

(D) a ferrous product conveyor and a scraping device, cantilevered into the second section; the scraping device including an arm with return, pivotally cantilevered from the conveyor, a first strip connected to an upper mounting formed in a plurality of break away strip sections at an end of the arm, to scrape the magnet strips; and an air knife positioned to discharge air at materials scraped from the magnet strips;

(E) a plurality of extensions on the third section, the extensions being clamped to the drum wall between a ramp and a bar mounted on the drum and being extended at an angle away from the drum by the bar affixed to the drum;

(F) a bar screen and a conveyor, cantilevered into the third section; the bar screen including a pivot bar; a plurality of curved bars spaceably connected to the pivot bar, positioned over the conveyor; a slide bracket with pneumatic return, over which at least a portion of the curved bars are positioned, rotatably connected to the conveyor and holding the curved bars near the wall of the drum; a vertically positioned return, connected between the slide bracket and conveyor; a slide connected to the slide bracket, positioned in a line of a trajectory taken by materials falling from the lifters; and (G) a seal chamber positioned over the mouth of the drum, including an inlet cylinder; an outer plate, connected to the inlet cylinder; a lower plate, retainer, and curtain connected to the outer plate, forming an inlet opening therebetween; and a slide plate, positioned within the inlet cylinder, connected to a portion of the seal chamber.

* * * * *